(12) United States Patent
Lamsal et al.

(10) Patent No.: US 11,882,786 B2
(45) Date of Patent: *Jan. 30, 2024

(54) METHOD FOR RECOMMENDING SEEDING RATE FOR CORN SEED USING SEED TYPE AND SOWING ROW WIDTH

(71) Applicant: CLIMATE LLC, Saint Louis, MO (US)

(72) Inventors: Sanjay Lamsal, San Francisco, CA (US); Lijuan Xu, Foster City, CA (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,128

(22) Filed: Sep. 19, 2022

(65) Prior Publication Data

US 2023/0030200 A1    Feb. 2, 2023

Related U.S. Application Data

(63) Continuation of application No. 17/083,288, filed on Oct. 28, 2020, now Pat. No. 11,445,660, which is a
(Continued)

(51) Int. Cl.
*A01C 7/10* (2006.01)
*A01B 79/00* (2006.01)
*A01C 21/00* (2006.01)
*G06N 5/04* (2023.01)
*G06N 7/01* (2023.01)

(52) U.S. Cl.
CPC .......... *A01C 7/102* (2013.01); *A01B 79/005* (2013.01); *A01C 21/00* (2013.01); *G06N 5/04* (2013.01); *G06N 7/01* (2023.01)

(58) Field of Classification Search
CPC ....... A01C 7/102; A01C 21/00; A01B 79/005; G06N 5/04; G06N 7/01
See application file for complete search history.

(56) References Cited

U.S. PATENT DOCUMENTS 6,662,185 B1    12/2003    Stark et al.
10,342,174 B2    7/2019    Xu et al.
(Continued)

*Primary Examiner* — Jonathan Han
(74) *Attorney, Agent, or Firm* — Harness, Dickey & Pierce, P.L.C.

(57) ABSTRACT

A computer system and computer-implemented techniques for determining and presenting improved seeding rate recommendations for planting seeds in a field are provided. In an embodiment, a computer-implemented method includes receiving digital data representing planting parameters including seed type information and planting row width, and retrieving a set of seeding models based upon the planting parameters, where each of the seeding models includes a regression model defining a relationship between plant yield and seeding rate on a specific field. The method also includes generating an empirical mixture model as a composite distribution of the set of seeding models, generating a seeding rate distribution for the planting parameters based upon the empirical mixture model, and calculating a seeding rate recommendation based on the seed rate distribution. The method then also includes planting plant seeds in the specific field consistent with the seeding rate recommendation.

20 Claims, 9 Drawing Sheets

Related U.S. Application Data continuation of application No. 16/505,486, filed on Jul. 8, 2019, now Pat. No. 10,827,669, which is a continuation of application No. 14/885,886, filed on Oct. 16, 2015, now Pat. No. 10,342,174.

(56) References Cited

U.S. PATENT DOCUMENTS

| | | |
|---|---|---|
| 10,827,669 B2 | 11/2020 | Xu et al. |
| 11,445,660 B2 * | 9/2022 | Xu .................. A01C 21/00 |
| 2003/0009282 A1 * | 1/2003 | Upadhyaya .......... A01B 79/005 |
| | | 701/50 |
| 2005/0086010 A1 | 4/2005 | Rao et al. |
| 2013/0066666 A1 * | 3/2013 | Anderson, Jr. ........ G06Q 10/06 |
| | | 705/7.12 |
| 2015/0206255 A1 | 7/2015 | Groeneveld |
| 2019/0327881 A1 | 10/2019 | Xu et al. |

* cited by examiner

Fig. 2
(a)
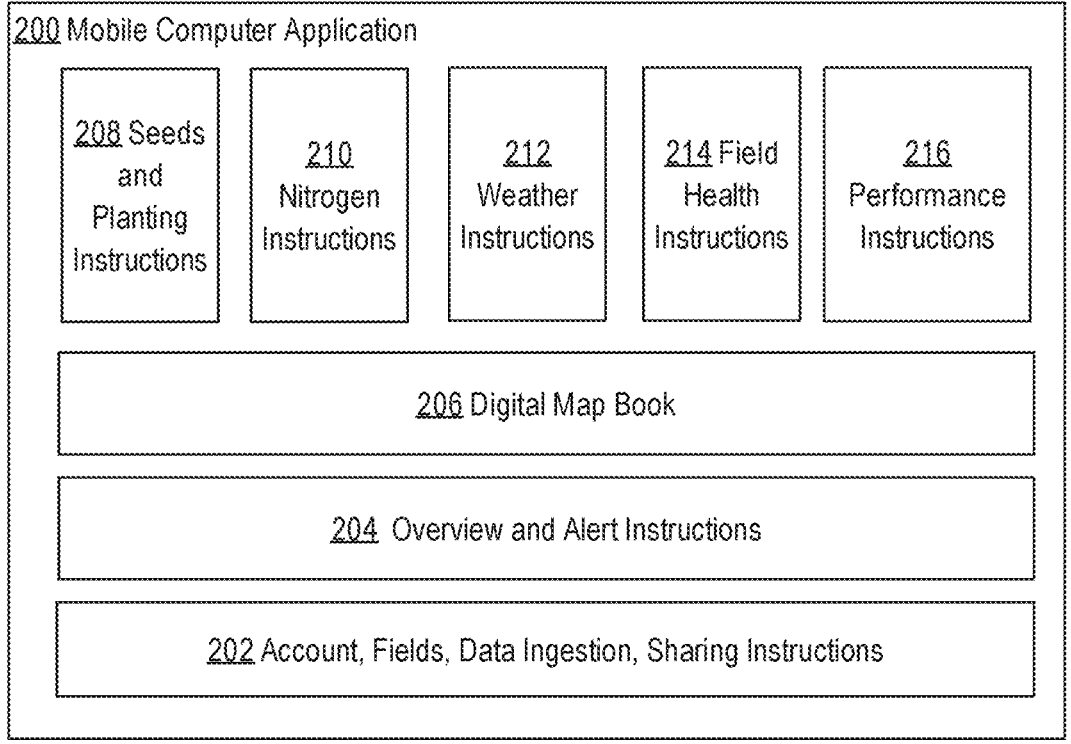
(b)
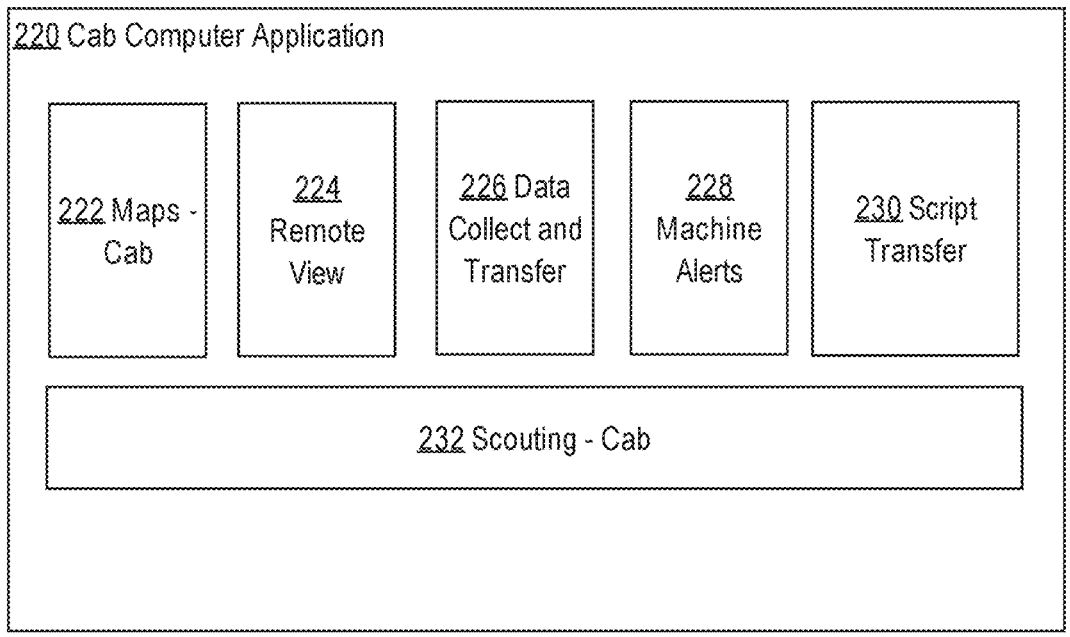

Data Manager

| | | Nitrogen | Planting | Practices | Soil | | |
|---|---|---|---|---|---|---|---|
| | Planting 1 (4 Fields)<br>Crop: Corn, Product --<br>Plant Date: 2016-04-12<br>RM: 112\|Pop:34000<br>[Edit] [Apply to Selected (0)] | Planting 2 (0 Fields)<br>Crop: Corn, Product --<br>Plant Date: 2016-04-15<br>RM: 87\|Pop:34000<br>[Edit] [Apply to Selected (0)] | Planting 3 (0 Fields)<br>Crop: Corn, Product --<br>Plant Date: 2016-04-13<br>RM: 87\|Pop:34000<br>[Edit] [Apply to Selected (0)] | Planting 4 (1 Fields)<br>Crop: Corn, Product --<br>Plant Date: 2016-04-13<br>RM: 112\|Pop:34000<br>[Edit] [Apply to Selected (0)] | + Add New Planting Plan | | |

| | | CROP | PLANTED ACRES | PRODUCT | RELATIVE MATURITY | TARGET YIELD | POPULATION (AVG) | PLANT D |
|---|---|---|---|---|---|---|---|---|
| ☐ | Select All | | | | | | | |
| ☐ | Ames, IA 1<br>○ Corn\|78.19ac\|Boone, IA PRO | Corn | -- | DMC82-96 | 112 | 160 | 34,000 | Apr 13, 201 |
| ☐ | Austin, MN 1<br>○ Corn\|80ac\|Freeborn, MN PRO | Corn | -- | W7568P30 | 114 | 160 | 36,000 | Apr 13, 201 |
| ☐ | Boone, IN 1<br>○ Corn\|48.31ac\|Boone, IN PRO | Corn | -- | DMC82-96 | 112 | 120 | 34,000 | Apr 13, 201 |
| ☐ | Champaign 1<br>○ Corn\|80ac\|Champaign, IL PRO | Corn | -- | -- | 112 | 200 | 34,000 | Apr 12, 201 |
| ☐ | E. Nebraska 1<br>○ Corn\|214.22ac\|Burt, NE PRO | Corn | -- | -- | 112 | 160 | 34,000 | Apr 12, 201 |

FIG. 9

METHOD FOR RECOMMENDING SEEDING RATE FOR CORN SEED USING SEED TYPE AND SOWING ROW WIDTH

CROSS-REFERENCE TO RELATED APPLICATIONS

This application is a continuation of U.S. patent application Ser. No. 17/083,288, filed Oct. 28, 2020, which is a continuation of U.S. patent application Ser. No. 16/505,486, filed Jul. 8, 2019, which is a continuation of U.S. patent application Ser. No. 14/885,886, filed Oct. 16, 2015, the contents of each of which are incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to computer-implemented techniques for predicting or recommending an optimal seeding rate for hybrid corn seed based upon hybrid seed type and sowing row width.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Seeding rate is one of many important agronomical management decisions a corn grower makes each year. Seeding rate refers to the number of seeds planted in an acre of land. Seed costs may constitute up to 14% of a grower's total production cost per year. Therefore it is important to determine an optimal seeding rate that produces that desired return for the grower. Different types of corn plants may produce different yields based upon population density. As a result the hybrid seed type may affect the relationship between seeding rate and yield.

In general, corn plants within a field share resources and as a result more densely populated corn plants produce smaller ears than corn plants that are more spread out. Corn response to increased seeding rate is dependent on a biologically complex process which involves both vegetative and reproductive growth and affects grain yield through various components such as number of ears per plant, number of kernels in an ear and kernel weight. As a result, the final yield is a trade-off between more plants in an area and the decreased yield per plant due to intensified inter-plant competition. Seeding rate is also affected by soil productivity, weather conditions, and sowing row width. Determining optimal seeding rate for a grower may depend on hybrid seed varieties and planting strategies.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 9 depicts an example embodiment of a spreadsheet view for data entry.

DETAILED DESCRIPTION

Figure 1:
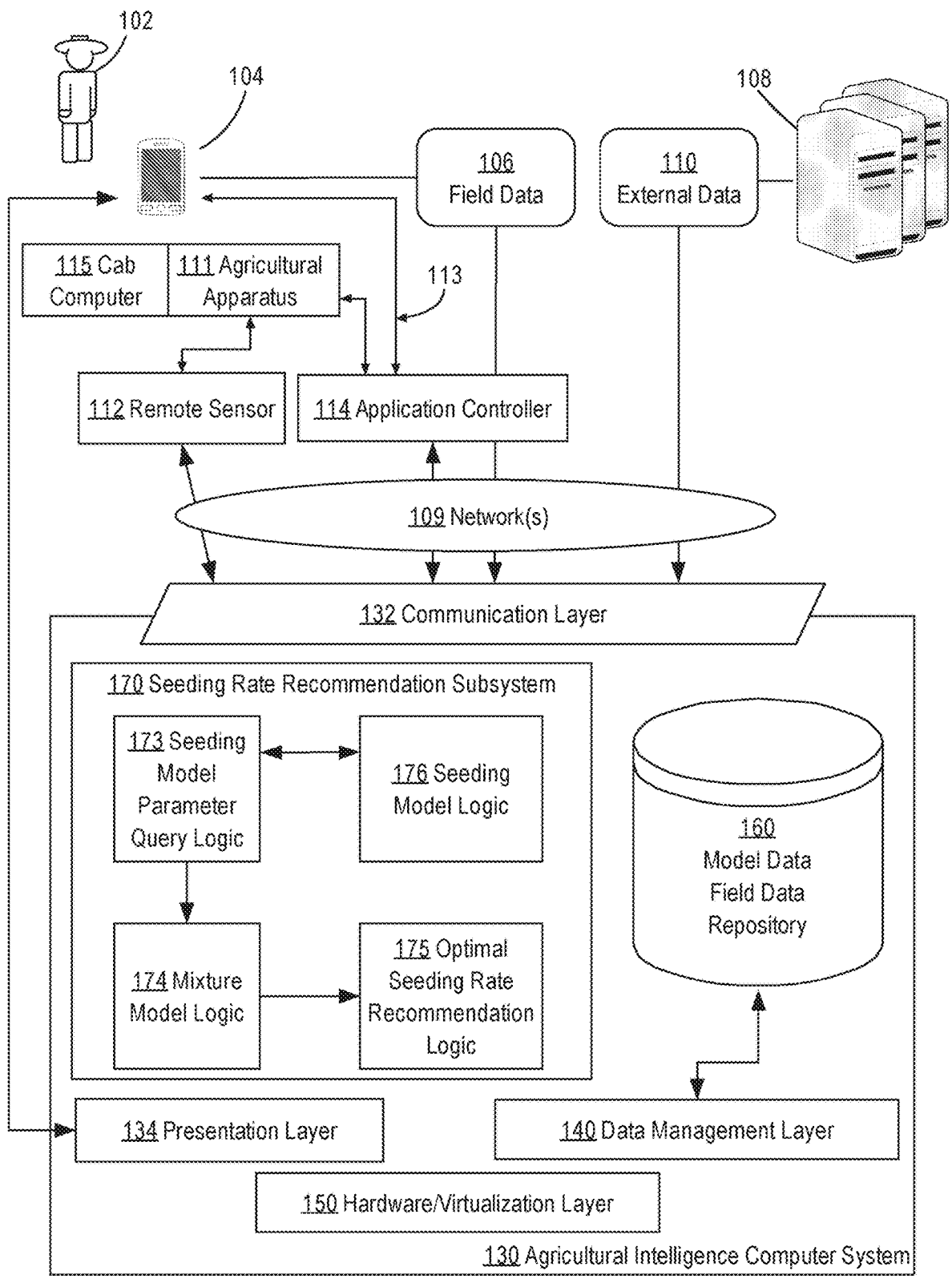
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. SEEDING RATE RECOMMENDATION SUBSYSTEM
   2.6. IMPLEMENTATION EXAMPLE—HARDWARE OVERVIEW
3. FUNCTIONAL OVERVIEW
   3.1. SEEDING MODEL PARAMETER QUERY LOGIC
   3.2. MIXTURE MODEL LOGIC
   3.3. OPTIMAL SEEDING RATE RECOMMENDATION LOGIC
   3.4. SEEDING MODEL LOGIC

1. GENERAL OVERVIEW

A computer system and computer-implemented techniques are provided for determining and presenting improved seeding rate recommendations for sowing hybrid seeds in a field. In an embodiment, determining and presenting seeding rate recommendations for a field may be accomplished using a server computer system that is configured and programmed to receive over a digital communication network, electronic digital data representing hybrid seed properties, including hybrid seed type, and sowing row width. Using digitally programmed seeding query logic, the computer system is programmed to receive digital data representing planting parameters including hybrid seed type information and sowing row width. Using the seeding query logic, the system is programmed to retrieve a set of one or more seeding models from an electronic digital seeding data repository based upon the planting parameters. Each of the seeding models retrieved contain a regression model that models the relationship between plant yield and seeding rate on a specific field tested with the hybrid seed type. "Model," in this context, refers to a set of computer executable instructions and associated data that can be invoked, called, executed, resolved or calculated to yield digitally stored output data based upon input data that is received in electronic digital form. It is convenient, at times, in this disclosure to specify a model using one or more mathematical equations, but any such model is intended to be implemented in programmed computer-executable instructions that are stored in memory with associated data.

Using mixture model logic, the computer system is programmed to generate an empirical mixture model in digital computer memory that represents a composite distribution of the set of one or more seeding models. Using the mixture model logic, the computer system is programmed to generate an optimal seeding rate distribution dataset in digital computer memory based upon the empirical mixture model, where the optimal seeding rate distribution dataset represents the distribution of optimal seeding rates across all measure fields.

Using optimal seeding rate recommendation logic, the computer system is programmed to calculate and present on a digital display device an optimal seeding rate recommendation that is based upon the optimal seeding rate distribution dataset.

2. EXAMPLE AGRICULTURAL INTELLIGENCE COMPUTER SYSTEM

2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 8:
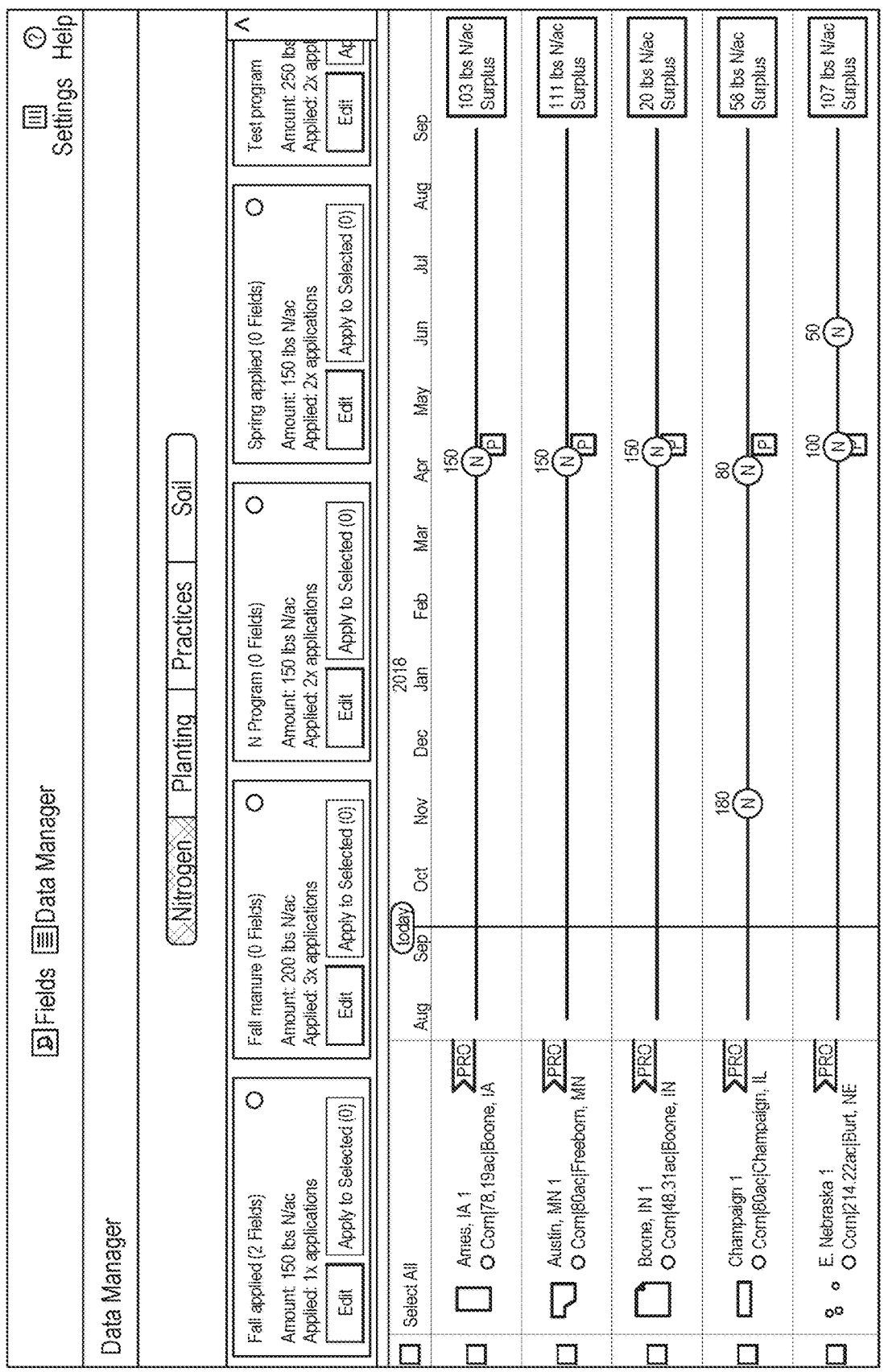
FIG. 8 depicts an example embodiment of a timeline view for data entry.

FIG. 8 depicts an example embodiment of a timeline view for data entry. Using the display depicted in FIG. 8, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 8, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 8, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 8, the interface may update to indicate that the "Fall applied" program is no longer being applied to the top field. While the nitrogen application in early April may remain, updates to the "Fall applied" program would not alter the April application of nitrogen.

FIG. 9 depicts an example embodiment of a spreadsheet view for data entry. Using the display depicted in FIG. 9, a user can create and edit information for one or more fields. The data manager may include spreadsheets for inputting information with respect to Nitrogen, Planting, Practices, and Soil as depicted in FIG. 9. To edit a particular entry, a user computer may select the particular entry in the spreadsheet and update the values. For example, FIG. 9 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
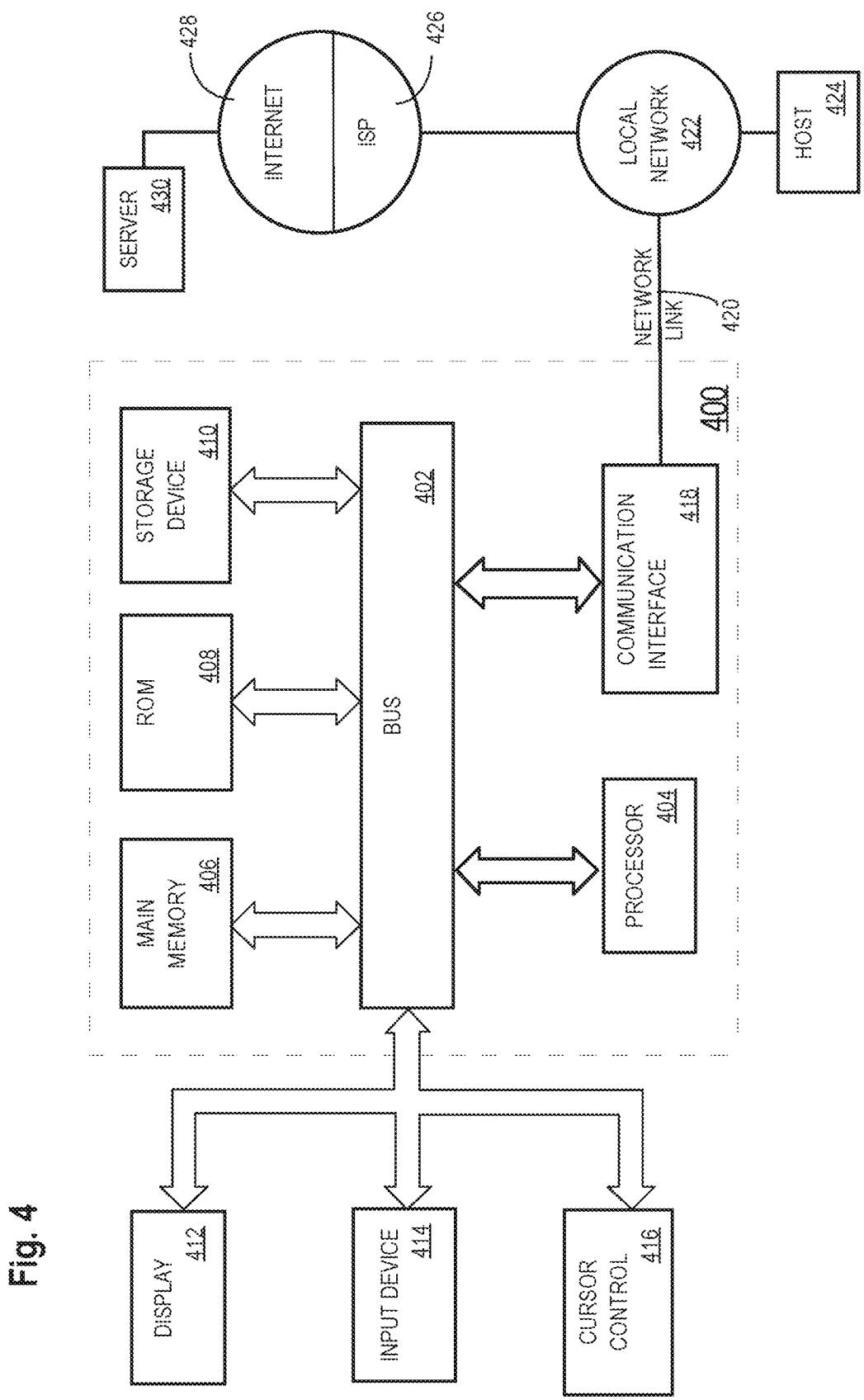
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into soil zones along with a panel identifying each soil zone and a soil name, texture, and drainage for each zone. Mobile computer application 200 may also display tools for editing or creating such, such as graphical tools for drawing soil zones over a map of one or more fields. Planting procedures may be applied to all soil zones or different planting procedures may be applied to different subsets of soil zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and U.S. Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. No. 8,767,194 and U.S. Pat. No. 8,712,148 may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
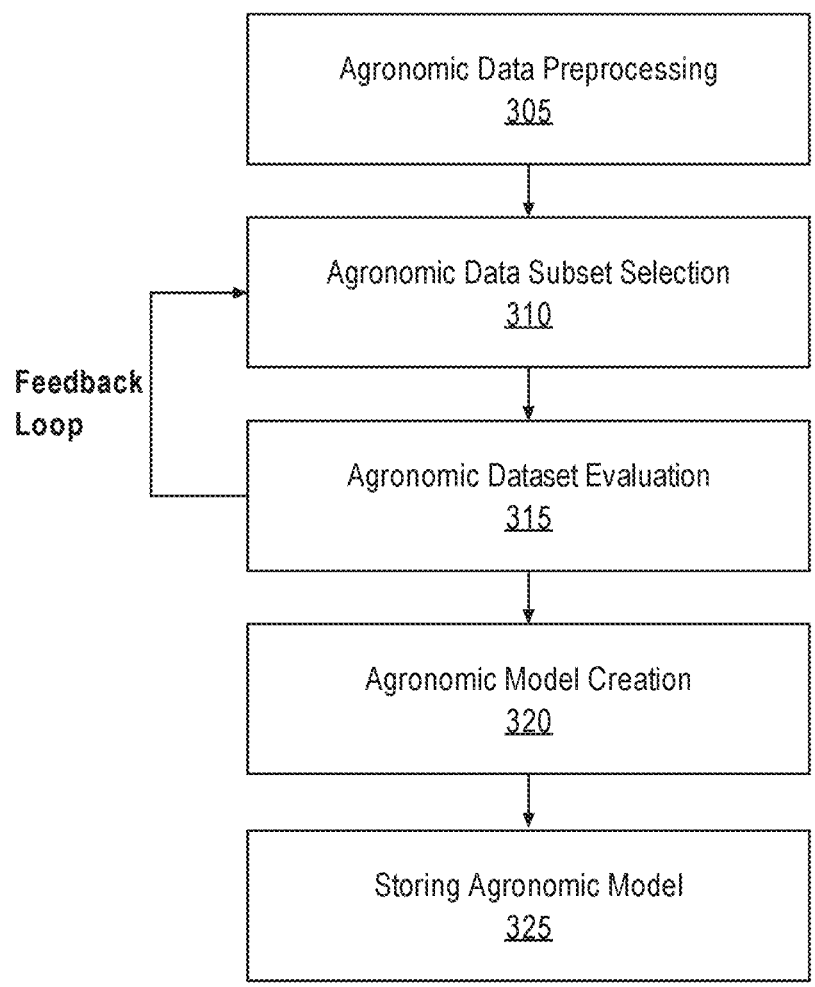
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Seeding Rate Recommendation Subsystem

In an embodiment, the agricultural intelligence computer system 130, among other components, includes a seeding rate recommendation subsystem 170. The seeding rate recommendation subsystem 170 is configured to predict an optimal seeding rate recommendation for hybrid corn seed based upon hybrid seed type and sowing row width. The seeding rate recommendation subsystem 170 uses field data 106 and external data 110 to create and retrieve digital seeding models related to multiple measured fields.

In an embodiment, the seeding rate recommendation subsystem 170 contains specially configured logic including, but not limited to, seeding model parameter query logic 173, mixture model logic 174, optimal seeding rate recommendation logic 175, and seeding model logic 176. Each of the foregoing elements is further described in structure and function in other sections herein. "Logic," as used in FIG. 1, refers in at least one embodiment to regions of main memory in the agricultural intelligence computer system 130 into which programmed, executable instructions have been loaded, and which instructions are configured when executed to cause the computer to perform the functions that are described herein for that logical element. For example, seeding model parameter query logic 173 indicates a region of main memory into which the computer has loaded instructions, which when executed cause the performance of the interface functions that are further described herein. These elements of 1 also indirectly indicate how a typical programmer or software engineer would organize the source code of programs that implement the functions that are described; the code may be organized into logical modules, methods, subroutines, branches, or other units using an architecture corresponding to FIG. 1.

Seeding model parameter query logic 173 is generally configured or programmed to retrieve multiple digital seeding models related to multiple measured fields based upon the input parameters received from the field data 106. A digital seeding model correlates crop yield to seeding rate based upon seeding strategies, such as seeding row width, for measured fields. Mixture Model logic 174 is generally configured or programmed to generate an empirical mixture model based upon seeding models of multiple measured fields. Optimal seeding rate recommendation logic 175 is generally configured or programmed to determine an optimal seeding rate that maximizes yield or maximizes profit based upon the generated empirical mixture model. Seeding model logic 176 is generally configured or programmed to generate a seeding model based upon multiple types of field specific data for a single measured field. The seeding model includes, but is not limited to, regression models modeling the corn yield to seeding rate, dataset of distributions for regression parameters, and datasets that include multiple data points within a measured field.

Each of the seeding model parameter query logic 173, mixture model logic 174, optimal seeding rate recommendation logic 175, and seeding model logic 176 may be implemented using one or more computer programs or other software elements that are loaded into and executed using one or more general-purpose computers, logic implemented in field programmable gate arrays (FPGAs) or application-specific integrated circuits (ASICs). While FIG. 1 depicts seeding model parameter query logic 173, mixture model logic 174, optimal seeding rate recommendation logic 175, and seeding model logic 176 in one computing system, in various embodiments, logics 173, 174, 175, and 176 may operate on multiple computing systems.

In an embodiment, the implementation of the functions described herein for seeding model parameter query logic 173, mixture model logic 174, optimal seeding rate recommendation logic 175, and seeding model logic 176 using one or more computer programs or other software elements that are loaded into and executed using one or more general-purpose computers will cause the general-purpose computers to be configured as a particular machine or as a computer that is specially adapted to perform the functions described herein. Each of the items of logic in FIG. 1, and in all other drawing figures herein, may represent a region or set of one or more pages of main memory storing programmed instructions which when executed cause performing the process steps or algorithm steps that are disclosed herein. Thus the logic elements do not represent mere abstractions but represent real pages of memory that have been loaded with executable instructions. Further, each of the flow diagrams that are described further herein may serve as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

2.6. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0. FUNCTIONAL OVERVIEW

Figure 5:
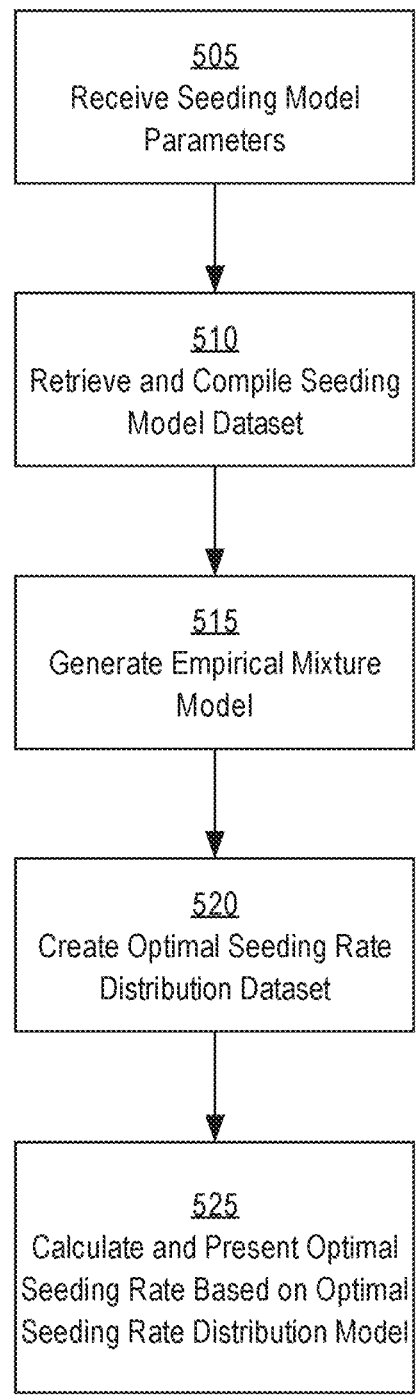
FIG. 5 depicts an example programmed algorithm or process for determining a recommended seeding rate for a specific hybrid seed and sowing row width of corn planted at a specific geo-location.

FIG. 5 is a flow diagram that depicts a process for determining an optimal seeding rate for a specific hybrid seed and sowing row width of corn planted at a specific geo-location. FIG. 5 may be implemented, in one embodiment, by programming the elements of the agricultural intelligence computer system 130 to perform the functions that are described in this section, which may represent disclosure of an algorithm for computer implementation of the functions that are described. For purposes of illustrating a clear example, FIG. 5 is described in connection with certain elements of FIG. 1. However, other embodiments of FIG. 5 may be practiced in many other contexts and references herein to units of FIG. 1 are merely examples that are not intended to limit the broader scope of FIG. 5.

3.1. Seeding Model Parameter Query Logic

At step 505, hybrid seed and field data is received by the agricultural intelligence computer system 130. For example, the communication layer 132 of the agricultural intelligence computer system 130 may receive field data 106 from the field manager computing device 104. Field data 106 may include, but is not limited to, specific hybrid seed identifiers, proposed sowing row width for the specific hybrid seed, geo-location of the user's 102 field, soil properties of the field, climate conditions and micro-climates conditions for the field, and other proposed agricultural strategies.

In an embodiment, the field manager computing device 104 sends field data 106. For example, the presentation layer 134 of the agricultural intelligence computer system 130 may cause display of an interface on field manager computing device 104 for inputting information, such as the boundaries of the field, the types of hybrid seed planted, sowing row width, and other crop and field related information. The communication layer 132 may then receive the field data 106 and relay it to the seeding model parameter query logic 173.

At step 510, a set of digital seeding models is compiled. In an embodiment, the seeding model parameter query logic 173 uses the received field data 106 to determine which seeding models are necessary for the set of digital seeding models. In an embodiment, field-specific data associated with a set of test fields is stored in the model and field data repository 160. The test fields represent measured agricultural fields where multiple specific hybrid seeds using multiple specific sowing row widths and seeding rates have been previously planted and field-specific data has been previously collected. A seeding model within the set of seeding models includes a dataset of measured data points including, but not limited to, seeding rate and plant yield within a field, a calculated relationship, such as a linear relationship, between plant yield and seeding rate, and distributions related to calculation parameters for the relationship. In an embodiment, the size and boundaries of a test field may be based upon established CLUs.

In an embodiment, the seeding model parameter query logic 173 extracts a target hybrid seed and desired seeding row width from the field data 106. The seeding model parameter query logic 173 constructs a request for multiple seeding models based upon the target hybrid seed type and seeding row width. The request for multiple seeding models refers to seeding models constructed and stored in the model and field data repository 160. In an embodiment, the seeding model logic 176 creates multiple seeding models from data points collected from multiple test fields.

A seeding model is a model that describes a marginal relationship between plant yield and seeding rate for a given hybrid seed at a specific field. The marginal relationship is determined using multiple measured data points for a given field and given hybrid seed that has been planted according to a defined sowing row width. In an embodiment, the seeding model logic 176 determines the marginal relationship for a given hybrid seed and row width using linear regression. Linear regression is an approach for modeling the relationship of per plant yield and seeding rate of a fixed hybrid and field environment. This relationship is modeled between W (Y/ρ, yield per plant in units of bushels per 1000 seeds) and ρ (seeding rate in units of 1000 seeds per acre), with regression parameters $\beta_0$, $\beta_1$, and $\sigma$. The seeding model may also contain dataset distributions for parameters $\beta_0$, $\beta_1$, and $\sigma$ based upon previously observed data. Further details on creating a seeding model are discussed in the SEEDING MODEL LOGIC section herein.

In an embodiment, if the model and field data repository 160 does not contain seeding models matching the request parameters, then the seeding model parameter query logic 173 may request that the seeding model logic 176 create seeding models from data points collected from multiple test fields.

In an embodiment, data requests may include other matching parameters such as geo-location, soil properties, and similar climate conditions that are be used to retrieve a filtered set of seeding models that match the desired parameters. The model and field data repository 160 previously stores measured data points for multiple test fields including regression and distribution models that are based upon data points from the multiple test fields.

3.2. Mixture Model Logic

The agricultural intelligence computer system 130 implements mixture model logic 174 to generate an empirical mixture model that utilizes yield and seeding rate information from multiple test fields. At step 515, the mixture model logic 174 generates an empirical mixture model, which is a composite distribution of the set of seeding models retrieved by the seeding model parameter query logic 173. A composite distribution is a statistical approach to modeling the distribution of several separate distributional populations. In this case, the separate distributional populations refer to datasets representing multiple test fields. The empirical mixture model contains joint posterior distributions from the multiple test fields. In an embodiment, each joint posterior distribution is represented as $\theta_l$ where $\theta_l = \{\beta_{l,0}, \beta_{l,1}, \sigma_l\}$ and where "l" represents a test field in the set of test fields, $\{1, \ldots, L\}$. The empirical mixture model therefore may be used to evaluate user 102 field f in terms of its yield response to seeding rate based on those test fields:

$$p(\theta_f = \theta_0 | I_f = l) = p(\theta_l = \theta_0 | (Y_{l,1}, \rho_{l,1}), \ldots, (Y_{l,n_l}, \rho_{l,n_l}))$$

where:
- $p(\theta_f)$: is a set of joint posterior distributions for field f that are represented as $\theta_f = \{\beta_{f,0}, \beta_{f,1}, \sigma_f\}$.
- $\theta_0$: is any value within the parameter space.
- $\theta_l = \{\beta_{f,0}, \beta_{f,1}, \sigma_f\}$: are modeling parameters for each measured field l=1 ... L.
- $I_f$: is a membership variable for field f such that $p(I_f = l) = 1/L$ for any field l.

At step 520, the mixture model logic 174 uses the empirical mixture model to calculate an optimal seeding rate distribution for the target hybrid seed and row width. In an embodiment, the mixture model logic 174 may implement random sampling techniques such as Monte Carlo sampling to select which data points that are used to calculate the optimal seeding rate distribution. Monte Carlo sampling is a random sampling approach that uses a probability distribution to generate sample values. For example, random samples are influenced by the mean, median, and standard deviation values from posterior distributions.

In an embodiment, the optimal seeding rate distribution may be determined as an agronomical optimal seeding rate, where the agronomical optimal seeding rate $\rho_f^{ag}$ is the seeding rate that maximizes the expected yield. From the seeding rate model, which is described in the SEEDING MODEL LOGIC section, the agronomical optimal seeding rate can be derived as the negative inverse of $\beta_{f,1}$ such that, $$\rho_f^{ag} = -\frac{1}{\beta_{f,1}}.$$

Therefore the posterior distribution for the agronomical optimal seeding rate of a particular field is represented as a function of $\beta_{f,1}$ as:

$$\rho_f^{ag} | (Y_{f,1}, \rho_{f,1}), \ldots, (Y_{f,n}, \rho_{f,n}) = -\frac{1}{\beta_{f,1} | (Y_{f,1}, \rho_{f,1}), \ldots, (Y_{f,n}, \rho_{f,n})}$$

In an embodiment, mixture model logic 174 stores the calculated optimal seeding rate distribution in the model and field data repository 160.

3.3. Optimal Seeding Rate Recommendation Logic

The optimal seeding rate recommendation logic 175 is configured to determine point estimation and an interval estimation of the optimal seeding rate for the given hybrid seed and sowing row width using the optimal seeding rate distribution. Point estimation of the optimal seeding rate is defined as a seeding rate value that provides either the maximum yield for the given planted hybrid seed or a seeding rate value that provides maximum profit for the user 102.

At step 525, the optimal seeding rate recommendation logic 175 evaluates the optimal seeding rate distribution and determines the point value for an agronomical optimal seeding rate that provides the user 102 with maximum yield for his planted hybrid seed crop. In addition, the optimal seeding rate recommendation logic 175 calculates an economical optimal seeding rate that provides the user 102 with maximum profit for his planted hybrid seed crop based on seed cost and grain price.

In an embodiment, the point value for the agronomical optimal seeding rate, $\rho_f^{ag}$, is calculated as the median value of the optimal seeding rate distribution. In another embodiment, the mean value of the optimal seeding rate distribution may be used as the agronomical optimal seeding rate. Using the agronomical optimal seeding rate, the optimal seeding rate recommendation logic 175 further calculates the median yield for the agronomical optimal seeding rate as:

$$\text{median } Y(\rho_f^{ag}) = \rho_f^{ag} \times \exp(\beta_0 + \beta_1 \times \rho_f^{ag})$$

where median $Y(\rho_f^{ag})$ equals the optimal seeding rate $\rho_f^{ag}$ multiplied by the exponential function of $\beta_0$ plus $\beta_1 \times \rho_f^{ag}$. The median yield and agronomical optimal seeding rate provide the user with a seeding rate value that maximizes crop yield and provides estimated median crop yield at that seeding rate. In an embodiment, the optimal seeding rate recommendation logic 175 also calculates variability associated with the agronomical optimal seeding rate as the median absolute deviation. Median absolute deviation is a measurement of variability for a posterior distribution.

In an embodiment, the optimal seeding rate recommendation logic 175 calculates the economical optimal seeding rate as $\rho_f^{ec}$ as the seeding rate that maximizes the grain price, multiplied by the median yield minus the cost (seed price multiplied by seeding rate), such that:

$$\rho_f^{ec} = \text{argmax}_\rho(p_g \times \text{median } Y(\rho) - p_s \times \rho)$$

where:
- $\text{argmax}_\rho(p_g \times \text{median } Y(\rho) - p_s \times \rho)$: is the value of seeding rate $\rho$ that maximizes the given function, i.e. $(p_g \times \text{median } Y(\rho) - p_s \times \rho)$.
- $p_g$: is the grain price represented in dollars per bushel ($/bu).
- $p_s$: is the seed price represented in dollars per 1000 seeds ($/1000 seeds).

The economical optimal seeding rate may differ from the agronomical optimal seeding rate because the economical optimal seeding rate is dependent upon grain and seed price. For example, if the price of purchasing seed is relatively high and the grain sales price is relatively low, then from an economical perspective producing the maximum amount of corn yield may not result in maximum profit. Therefore it is beneficial for the user 102 to be presented with both the agronomical optimal seeding rate and the economical optimal seeding rate. In an embodiment, the point estimates of agronomical optimal seeding rate and the economical optimal seeding rate, together with their variability estimations such as the median absolute deviation are communicated to the communication layer 132, which then presents the optimal seeding rate values to the field manager computing device 104 for the user 102 to access.

3.4. Seding Model Logic

Figure 6:
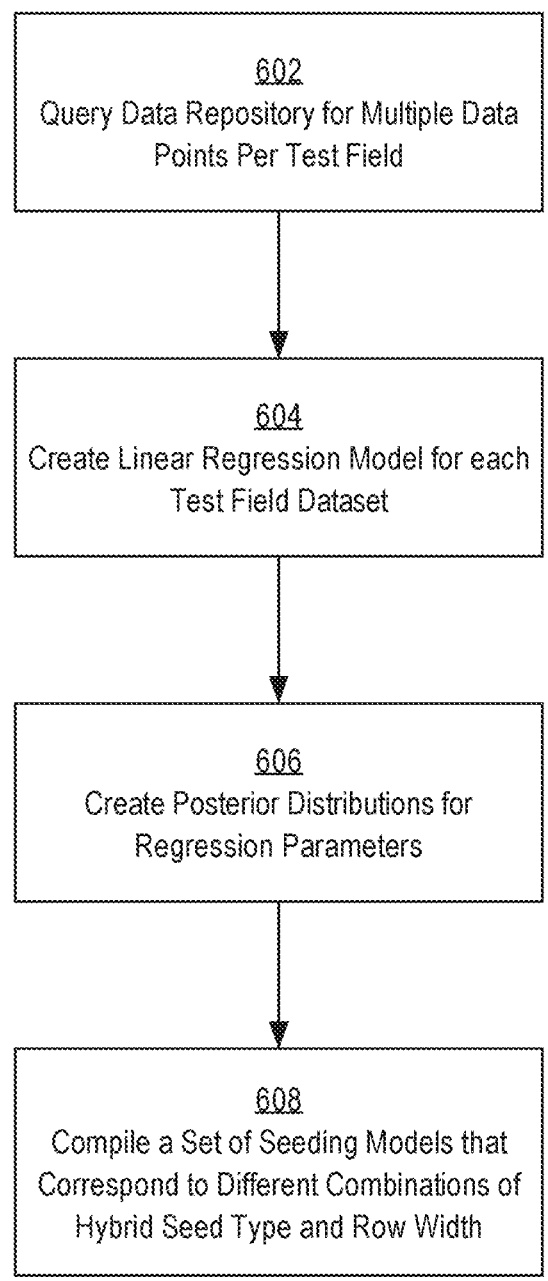
FIG. 6 depicts an example programmed algorithm or process by which seeding model logic is used to create a seeding model for a specific test field.

The seeding model is a model that describes a marginal relationship between plant yield and seeding rate for a given hybrid seed at a specific field. FIG. 6 depicts an embodiment of the process by which the seeding model logic 176 creates a seeding model for a specific test field. At step 602 the seeding model logic 176 queries the model and field data repository 160 for multiple data points on test fields corresponding to the target hybrid seed and row width desired by the user 102. The model and field data repository 160 then returns a dataset of the requested multiple data points organized by test field. The purpose of organizing the data into test field datasets is that each test field may have other properties that affect the yield outcome differently. Grouping the data points into test field datasets minimizes the effects of unknown latent variables that may be specific to each test field.

In an embodiment, if the model and field data repository 160 does not contain specific data points for the multiple test fields, then the agricultural intelligence computer system 130 may retrieve the data from one or more external data server computers 108. An example of specific data retrieved from the external data server computer 108 is external data 110, as depicted in FIG. 1. The external data 110 is received by the communication layer 132 and then stored in the model and field data repository 160 to be used by the seeding model logic 176.

At step 604, the seeding model logic 176 creates a linear regression model for each test field dataset. In an embodiment, the seeding model logic 176 implements a linear regression model based upon Duncan's exponential function. Duncan's exponential function defines a linear relationship between the logarithm of the average yield per plant and the population density of plants. In this case, population density of plants is measured by the seeding rate and row width of planted seeds within a field. Notation for measuring the plant yield and seeding rate are as follows:
- Y: yield per area in units of bushels per acre;
- $\rho$: seeding rate in units of 1000 seeds per acre.
- W: $Y/\rho$, yield per plant in units of bushels per 1000 seeds (or plants).

Duncan's exponential function models the logarithmic relationship as:

$$\log(W) = \beta_0 + \beta_1 \times \rho + \varepsilon$$

where:
- $\varepsilon$ is an error term that is based upon a normal error distribution such as $N(0, \sigma^2)$
- $\beta_0$ and $\beta_1$ are regression coefficients.

Figure 7A:
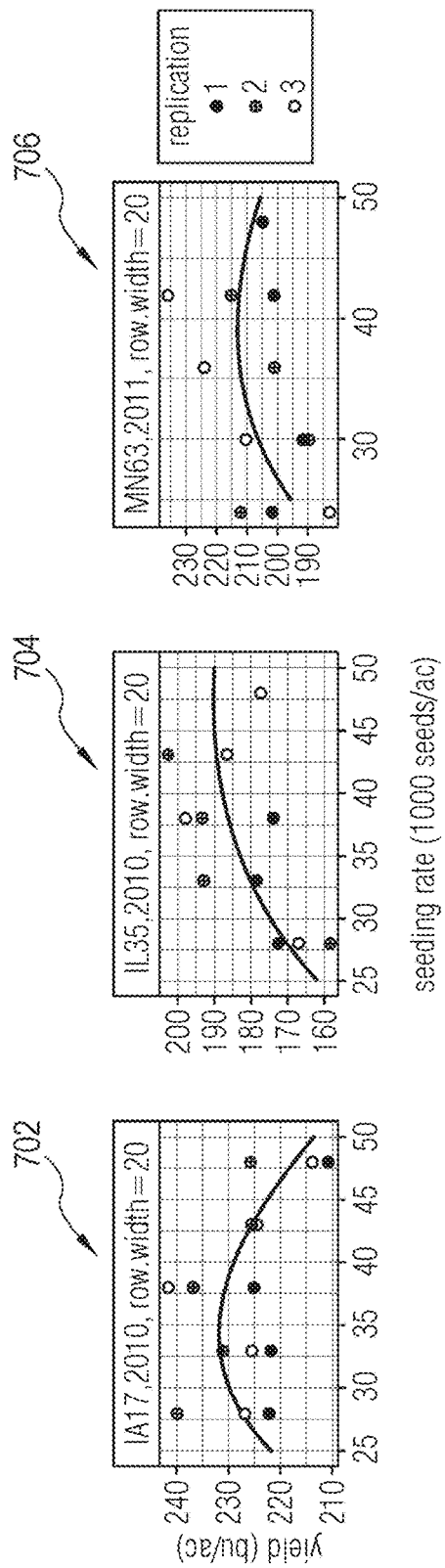
FIG. 7A and FIG. 7B depict graphical relationships between yield and seeding rate.
Figure 7B:
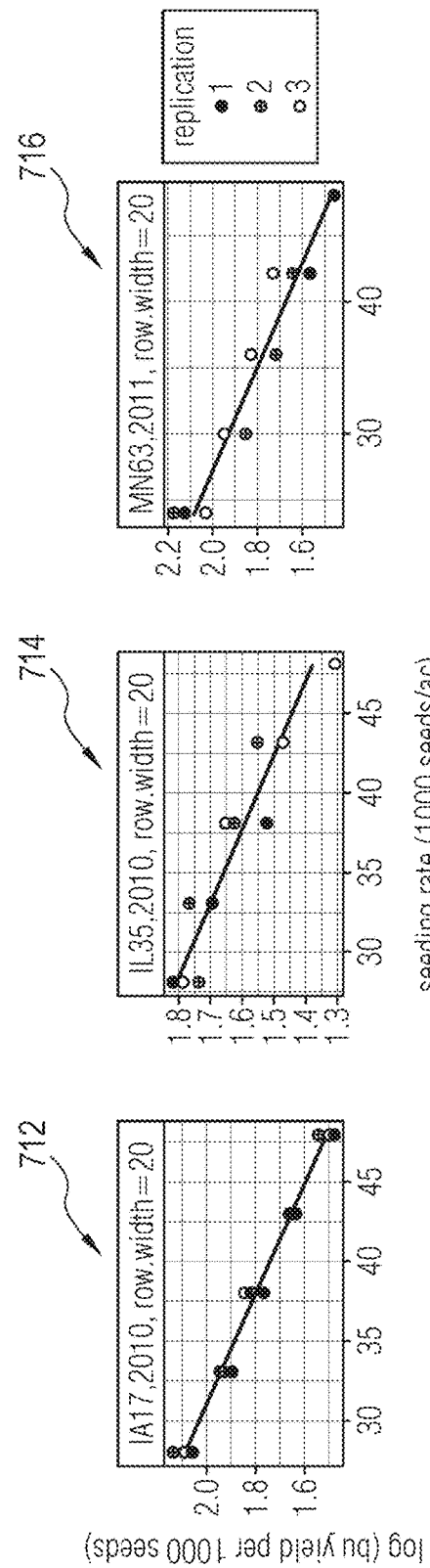

FIG. 7A and 7B depict the marginal relationship between yield and seeding rate. FIG. 7A illustrates that a parabolic relationship exists between yield, measured in bushels per acre (bu/ac), and seeding rate, measured as 1000 seeds planted per acre. Graph 702 depicts data points collected for a specific hybrid seed type from various locations within field "IA17" during a growing season where seeds were planted using a row width of 20 inches. The horizontal axis represents the seeding rate (1000 seeds/ac) and the vertical axis represents the corn yield (bu/ac). Graph 704 and 706 each depict data points from fields "IL35" during the same growing season and "MN63" during the following growing season respectively. FIG. 7B depicts the same data as in FIG. 7A but the y-axis represents the log yield per plant instead of yield per acre and highlights a linear relationship between the log yield per plant and the seeding rate.

In an embodiment, the relationship between the corn yield, Y, and the seeding rate, $\rho$, may be expressed as a log-normal distribution:

$$Y = \mathcal{LN}(\beta_0 + \beta_1 \times \rho + \log_\rho, \sigma^2)$$

The log-normal distributions for each measured field are stored within a seeding model.

At step 606, the seeding model logic 176 creates posterior distributions for parameters $\beta_0$, $\beta_1$, and $\sigma$. A posterior distribution is a normalized distribution that takes into account prior probability and observed outcomes and thereby creates a more informative distribution. In an embodiment, the seeding model logic 176 may impose non-informative prior calculation such as Jeffrey's prior to determine posterior distributions for linear model parameters $\beta$ and $\sigma^2$, where $\beta$ is the transpose matrix of $(\beta_0, \beta_1)$. Jeffrey's prior is a method for imposing a standard non-informative prior for linear models. A non-informative prior is objective information related to a variable that provides some basis for determining the outcome of that specific variable.

In an embodiment, non-informative prior for regression coefficients states that $\beta_1 < 0$ and that joint prior distributions for $\beta$ and $\sigma^2$ assume proportionality to $\sigma$, such that:

$$p(\beta, \sigma^2) \propto 1/\sigma^2$$

where $(\beta, \sigma^2)$: represents joint prior distributions for $\beta$ and $\sigma^2$.

In an embodiment, the joint posterior distribution for $\beta$ is represented as a normal distribution where $\beta$ is a function of $\sigma^2$ and observational pairs of corn yield and seeding rate, such that:

$$\beta | \sigma^2, (Y_1, \rho_1), \ldots, (Y_n, \rho_n) \sim \mathcal{N}(\hat{\beta}, \sigma^2(X^T X)^{-1}$$

where $(Y_1, \rho_1), \ldots, (Y_n, \rho_n)$ : are n pairs of corn yield and seeding rate observations for a given hybrid seed and field; $\hat{\beta}$ : is the estimated $\beta$ value based upon a seeding rate covariate matrix X and a matrix of observations W, $\hat{\beta}=(X^T X)^{-1} X^T W$; X : is a covariate matrix of seeding rates, $$X = \begin{pmatrix} 1 & 1 & \cdots & 1 \\ \rho_1 & \rho_2 & \cdots & \rho_n \end{pmatrix}^T;$$

such that W : are the observations for yield per plant, $W =(W_1, \ldots, W_n)^T$; $\sigma^2$: in posterior follows an inverse gamma distribution of n pairs of corn yield and seeding rate observations for a given hybrid seed and field, such that:

$$\sigma^2 \mid (Y_1, \rho_1), \ldots, (Y_n, \rho_n) \sim \text{Inverse Gamma}\left(\frac{n-2}{2}, \frac{(n-2)\hat{\sigma}^2}{2}\right)$$

where $\hat{\sigma}^2$: is the estimated $\sigma^2$ value, $$\frac{\sum_{i=1}^n (W_i - \hat{\beta}_0 - \hat{\beta}_1 \times \rho_i)^2}{n-2}.$$

At step 608, the seeding model logic 176 compiles seeding models for different combinations of the given hybrid seed and sowing row width for measured test fields, where each seeding model corresponds to a single test field. Each seeding model includes retrieved data points on the test field, the log-normal distribution created using Duncan's exponential function, and the joint posterior distributions calculated using Jeffrey's prior method. The compiled seeding models are then stored in the model and field database 160.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of determining and presenting an improved seeding rate recommendation for planting plant seeds in a field, the method comprising:
   using seeding query logic in a server computer system, receiving digital data representing planting parameters comprising information for a seed type and planting row width;
   using the seeding query logic, retrieving a set of multiple digital seeding models from an electronic digital seeding data repository based upon the planting parameters, wherein the multiple digital seeding models each include a regression model defining, for the seed type, a relationship between plant yield and seeding rate at a specific field;
   using mixture model logic in the server computer system, generating an empirical mixture model in digital computer memory as a composite distribution of the multiple digital seeding models;
   using the mixture model logic, generating a seeding rate distribution for the planting parameters, in the digital computer memory, based upon a sampling of values from the empirical mixture model;
   using optimal seeding rate recommendation logic in the server computer system, calculating a seeding rate recommendation, for the planting parameters, based upon the seeding rate distribution; and
   planting, by a planter apparatus in communication with the server computer system, plant seeds in the specific field consistent with the seeding rate recommendation.

2. The method of claim 1, wherein the planting parameters further include soil property data, climatology data related to a climate at or near a geographic location of the specific field, and geo-location data specifying a geography of the specific field.

3. The method of claim 1, wherein each regression model is based upon multiple data points measured at the specific field.

4. The method of claim 3, wherein the multiple data points measured at the specific field include, for each regression model, digital data representing the seed type, and also the plant yield and the seeding rate defined by said regression model.

5. The method of claim 3, wherein each digital seeding model further includes joint posterior distributions that represent distributions of regression parameters used to calculate the regression model of said digital seeding model.

6. The method of claim 1, wherein each regression model includes a log- normal distribution of the relationship between plant yield and seeding rate defined by said regression model at the specific field.

7. The method of claim 1, wherein generating the seeding rate distribution is based upon a negative inverse of parameter values selected from the empirical mixture model.

8. The method of claim 1, wherein generating the seeding rate distribution includes applying a random sampling to select the sampling of values from the empirical mixture model.

9. The method of claim 8, wherein applying the random sampling includes applying a Monte Carlo random sampling to select the sampling of values from the empirical mixture model.

10. The method of claim 1, wherein calculating the seeding rate recommendation includes calculating the seeding rate recommendation further based on a yield for a crop grown from the plant seeds planted in the specific field.

11. The method of claim 1, further comprising presenting the seeding rate recommendation and a variability associated with the seeding rate recommendation, where the variability is characterized as median absolute deviation.

12. A system for determining and presenting an improved seeding rate recommendation for planting plant seeds in a field, the system comprising:
    a server computer system configured to:
       receive digital data representing planting parameters comprising information for a seed type and planting row width;
       retrieve a set of digital seeding models from an electronic digital seeding data repository based upon the planting parameters, wherein the digital seeding models each contain a regression model defining, for the seed type, a relationship between plant yield and seeding rate at a specific field;

generate an empirical mixture model in digital computer memory based upon the digital seeding models, as a composite distribution of the digital seeding models;

generate a seeding rate distribution for the planting parameters, in the digital computer memory, based upon sampling of values from the empirical mixture model; and calculate a seeding rate recommendation, for the planting parameters, based upon the seeding rate distribution; and a planter apparatus configured to plant the specific field consistent with the seeding rate recommendation, in response to, at least in part, the seeding rate recommendation.

13. The system of claim 12, wherein the planting parameters further comprise soil property data, climatology data related to a climate at or near a geographic location of the field, and geo-location data specifying a geography of the field.

14. The system of claim 12, wherein each regression model for the seed type is based upon data points measured at the specific field.

15. The system of claim 14, wherein the data points measured at the specific field include, for each regression model, digital data representing the seed type, the plant yield, and the seeding rate of the seeds planted.

16. The system of claim 14, wherein each regression model for the seed type includes a log-normal distribution of the relationship between plant yield and seeding rate at the specific field.

17. The system of claim 14, wherein each digital seeding model further includes joint posterior distributions that represent distributions of regression parameters used to calculate the regression model of said digital seeding model.

18. The system of claim 12, wherein the server computer system is configured, in generating the seeding rate distribution, to generate the seeding rate distribution based upon a negative inverse of parameter values selected from the empirical mixture model.

19. The system of claim 18, wherein the server computer system is configured, in generating the seeding rate distribution, to apply a Monte Carlo random sampling generator to select the values from the empirical mixture model.

20. The system of claim 12, wherein the server computer system is configured, in calculating the seeding rate recommendation, to determine a median yield for the seeding rate distribution; and wherein the server computer system is configured to present the seeding rate recommendation at a display device in the planter apparatus, the seeding rate recommendation including a variability, which is characterized as median absolute deviation.

* * * * *